United States Patent
Rauber et al.

(10) Patent No.: US 8,966,001 B2
(45) Date of Patent: Feb. 24, 2015

(54) DEPLOYMENT AND DISTRIBUTION MODEL FOR IMPROVED CONTENT DELIVERY SYSTEM

(75) Inventors: Peter H. Rauber, Del Mar, CA (US);
Matthew S. Grob, San Diego, CA (US);
Baaziz Achour, San Diego, CA (US);
Brian K. Butler, San Diego, CA (US);
Peter Carson, San Diego, CA (US);
Sanjay K. Jha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 478 days.

(21) Appl. No.: 12/203,099

(22) Filed: Sep. 2, 2008
(Under 37 CFR 1.47)

(65) Prior Publication Data
US 2010/0057563 A1 Mar. 4, 2010

(51) Int. Cl.
*G06F 15/167* (2006.01)
*G06F 15/16* (2006.01)
(Continued)

(52) U.S. Cl.
CPC ............ *G06Q 30/02* (2013.01); *G06Q 30/0255* (2013.01); *G06Q 30/04* (2013.01);
(Continued)

(58) Field of Classification Search
USPC ......... 709/212, 213, 216, 217, 218, 229, 250; 715/700; 705/14.53
See application file for complete search history.

(56) References Cited

U.S. PATENT DOCUMENTS

| 4,962,457 A | 10/1990 | Chen et al. |
| 5,381,133 A | 1/1995 | Erhart et al. |

(Continued)

FOREIGN PATENT DOCUMENTS

| CN | 101176365 A | 5/2008 |
| CN | 101212646 A | 7/2008 |

(Continued)

OTHER PUBLICATIONS

Plagemann, T. et al.: "From content distribution networks to content networks—issues and challenges" Computer Communications, Elsevier Science Publishers BV, Amsterdam, NL, vol. 29, No. 5, Mar. 6, 2006, pp. 551-562, XP025089783 ISSN: 0140-3664 [retrieved on Mar. 6, 2006] the whole document.

(Continued)

*Primary Examiner* — Ranodhi Serrao
*Assistant Examiner* — Farrukh Hussain
(74) *Attorney, Agent, or Firm* — Stanton Braden

(57) ABSTRACT

A deployment and distribution model improves content delivery with a business incentive for placement of kiosks with one or more wireless access points in public locations so that portable media players (PMPs) can receive media content (e.g., audio, video, text, haptic content, etc.). In addition, coordination between subscribing users of PMPs, vendors who provide kiosks, and a network central controller of a content distribution system allow for prepositioning of video content at the kiosks through economically desirable low data rate communication links from the network (e.g., dial-up modem, DSL, etc.); coordinated queuing of downloads (e.g., partial downloads) between kiosk to PMP, peer-to-peer (P2P) downloading between PMPs, and uploads from PMP to kiosk; billing/crediting to correspond with such participation in the distribution; and changing priority/selection of prepositioning of content at kiosks to reflect a clientele profile.

13 Claims, 7 Drawing Sheets

(51) Int. Cl.
*G06F 3/00* (2006.01)
*G06Q 30/02* (2012.01)
*G06Q 30/04* (2012.01)
*G06Q 30/06* (2012.01)
*H04L 29/08* (2006.01)
*H04L 29/06* (2006.01)

(52) U.S. Cl.
CPC ............ *G06Q30/0601* (2013.01); *H04L 67/04* (2013.01); *H04L 69/14* (2013.01); *H04L 67/06* (2013.01); *Y02B 60/33* (2013.01)
USPC ........... 709/217; 709/212; 709/213; 709/216; 709/218; 709/250; 715/700

(56) References Cited

U.S. PATENT DOCUMENTS

| | | | |
|---|---|---|---|
| 5,493,291 A | 2/1996 | Bruggemann | |
| 5,799,256 A | 8/1998 | Pombo et al. | |
| 6,879,810 B2 | 4/2005 | Bouet | |
| 6,879,838 B2* | 4/2005 | Rankin et al. | 455/456.6 |
| 6,898,432 B1 | 5/2005 | Jiang | |
| 6,990,635 B2 | 1/2006 | Kurapati et al. | |
| 6,996,393 B2 | 2/2006 | Pyhalammi et al. | |
| 7,010,298 B2 | 3/2006 | Seedman et al. | |
| 7,096,100 B2 | 8/2006 | Arata | |
| 7,155,405 B2 | 12/2006 | Petrovich | |
| 7,250,860 B2 | 7/2007 | Smith et al. | |
| 7,302,465 B2 | 11/2007 | Ayres et al. | |
| 7,565,676 B2 | 7/2009 | Bell | |
| 7,653,341 B2 | 1/2010 | Bucher et al. | |
| 7,840,693 B2* | 11/2010 | Gupta et al. | 709/232 |
| 7,840,986 B2 | 11/2010 | Ali et al. | |
| 8,126,477 B2 | 2/2012 | Dravida et al. | |
| 2002/0035699 A1 | 3/2002 | Crosbie | |
| 2002/0062361 A1 | 5/2002 | Kivipuro et al. | |
| 2002/0076051 A1 | 6/2002 | Nii | |
| 2002/0120925 A1 | 8/2002 | Logan | |
| 2002/0198958 A1 | 12/2002 | Frenkiel et al. | |
| 2003/0035434 A1 | 2/2003 | Le et al. | |
| 2003/0228842 A1 | 12/2003 | Heinonen et al. | |
| 2004/0015984 A1 | 1/2004 | Yamamoto et al. | |
| 2004/0128324 A1 | 7/2004 | Sheynman et al. | |
| 2004/0128343 A1 | 7/2004 | Mayer | |
| 2004/0248557 A1 | 12/2004 | Muratsu | |
| 2004/0249768 A1 | 12/2004 | Kontio et al. | |
| 2005/0260973 A1 | 11/2005 | Van De Groenendaal | |
| 2006/0008256 A1 | 1/2006 | Khedouri et al. | |
| 2006/0015580 A1 | 1/2006 | Gabriel et al. | |
| 2006/0031163 A1 | 2/2006 | Kivipuro et al. | |
| 2006/0056336 A1 | 3/2006 | Dacosta | |
| 2006/0073810 A1 | 4/2006 | Phyalammi et al. | |
| 2006/0095582 A1 | 5/2006 | Nitya et al. | |
| 2006/0126556 A1 | 6/2006 | Jiang et al. | |
| 2006/0129855 A1 | 6/2006 | Rhoten et al. | |
| 2006/0135179 A1 | 6/2006 | Aaltonen | |
| 2006/0156209 A1 | 7/2006 | Matsuura et al. | |
| 2006/0173972 A1* | 8/2006 | Jung et al. | 709/217 |
| 2006/0218604 A1* | 9/2006 | Riedl et al. | 725/91 |
| 2006/0259580 A1 | 11/2006 | Laberteaux et al. | |
| 2006/0277028 A1 | 12/2006 | Chen et al. | |
| 2007/0016654 A1 | 1/2007 | Bowles et al. | |
| 2007/0021110 A1 | 1/2007 | Chaudhri et al. | |
| 2007/0055862 A1 | 3/2007 | Sharma | |
| 2007/0061863 A1 | 3/2007 | Rajasekaran | |
| 2007/0091872 A1 | 4/2007 | Bergenwall | |
| 2007/0112676 A1 | 5/2007 | Kontio et al. | |
| 2007/0135060 A1 | 6/2007 | Roskind et al. | |
| 2007/0138268 A1 | 6/2007 | Tuchman | |
| 2007/0143370 A1 | 6/2007 | Bushmitch et al. | |
| 2007/0168354 A1 | 7/2007 | Ramer et al. | |
| 2007/0174467 A1 | 7/2007 | Ballou et al. | |
| 2007/0174471 A1 | 7/2007 | Van Rossum | |
| 2007/0178830 A1 | 8/2007 | Janik et al. | |
| 2007/0214182 A1* | 9/2007 | Rosenberg | 707/104.1 |
| 2007/0228162 A1 | 10/2007 | Phillips | |
| 2007/0237101 A1 | 10/2007 | Cohen et al. | |
| 2007/0239724 A1 | 10/2007 | Ramer et al. | |
| 2007/0260635 A1 | 11/2007 | Ramer et al. | |
| 2007/0286100 A1 | 12/2007 | Saaranen et al. | |
| 2008/0005130 A1 | 1/2008 | Logan et al. | |
| 2008/0009268 A1 | 1/2008 | Ramer et al. | |
| 2008/0016201 A1 | 1/2008 | Thompson | |
| 2008/0034393 A1 | 2/2008 | Crayford | |
| 2008/0034394 A1* | 2/2008 | Jacobs et al. | 725/98 |
| 2008/0037438 A1 | 2/2008 | Twiss et al. | |
| 2008/0039058 A1 | 2/2008 | Ray | |
| 2008/0103975 A1* | 5/2008 | Taratino et al. | 705/57 |
| 2008/0195546 A1 | 8/2008 | Lilley | |
| 2008/0216145 A1 | 9/2008 | Barton et al. | |
| 2008/0235351 A1 | 9/2008 | Banga et al. | |
| 2008/0291855 A1* | 11/2008 | Bata et al. | 370/311 |
| 2009/0089188 A1 | 4/2009 | Ku et al. | |
| 2009/0282050 A1* | 11/2009 | Thomas et al. | 707/10 |
| 2010/0057924 A1 | 3/2010 | Rauber et al. | |
| 2010/0058377 A1 | 3/2010 | Grob et al. | |

FOREIGN PATENT DOCUMENTS

| | | |
|---|---|---|
| EP | 1944914 | 7/2008 |
| JP | 2002171511 A | 6/2002 |
| JP | 2003030087 A | 1/2003 |
| JP | 2003134436 A | 5/2003 |
| JP | 2003162599 A | 6/2003 |
| JP | 2004297605 A | 10/2004 |
| JP | 2005110016 A | 4/2005 |
| JP | 2005275740 A | 10/2005 |
| JP | 2006510270 A | 3/2006 |
| JP | 2006229444 A | 8/2006 |
| JP | 2007221715 A | 8/2007 |
| JP | 2007329972 A | 12/2007 |
| JP | 2008053824 A | 3/2008 |
| JP | 2008092526 A | 4/2008 |
| KR | 1020030024151 | 3/2003 |
| KR | 20030094361 A | 12/2003 |
| KR | 20040037490 A | 5/2004 |
| WO | 0180031 A1 | 10/2001 |
| WO | 2004054264 A1 | 6/2004 |
| WO | 2006098037 A1 | 9/2006 |
| WO | WO2007041597 A2 | 4/2007 |
| WO | WO2008033182 A1 | 3/2008 |
| WO | 2008041291 A1 | 4/2008 |
| WO | WO2008054802 | 5/2008 |

OTHER PUBLICATIONS

Gibbon D C et al: "The MIRACLE video search engine" Consumer Communications and Networking Conference, 2006. CCNC 2006. 20 06 3rd IEEE Las Vegas, NV, USA Jan. 8-10, 2006, vol. 1, Jan. 8, 2006, pp. 277-281, XP010893215.
International Search Report—PCT/US2009/055462—International Search Authority, European Patent Office, Sep. 2, 2010.
Written Opinion—PCT/US2009/055462—ISA/EPO—Feb. 9, 2010.
Taiwan Search Report—TW098129576—TIPO—Oct. 16, 2012.
Taiwan Search Report—TW098129300—TIPO—Nov. 11, 2012.

* cited by examiner

DEPLOYMENT AND DISTRIBUTION MODEL FOR IMPROVED CONTENT DELIVERY SYSTEM

CROSS REFERENCE TO CO-PENDING PATENT APPLICATIONS

The present Application for Patent is related to the following co-pending U.S. Patent Applications:

U.S. application Ser. No. 12/203,096, "Access Point for Improved Content Delivery System" by Peter Rauber, et al., filed concurrently herewith, assigned to the assignee hereof, and expressly incorporated by reference herein; and U.S. application Ser. No. 12/203,087, "Methods and Apparatus for an Enhanced Media Content Rating System" by Grob, et al., filed concurrently herewith, assigned to the assignee hereof, and expressly incorporated by reference herein.

FIELD OF INVENTION

Aspects disclosed herein pertain to a communication network that distributes media content to a mobile communication device via geographically positioned kiosks that support wireless access points, and in particular, to providing a subscription-based distribution service with wireless download in intermittent coverage areas.

BACKGROUND

Users desire continuous access to media content across a wide array of devices, both fixed and mobile. Abilities to rapidly download media content in a "pay per view" subscription from a set top box or to download or stream media content over a broadband connection raise expectations for instant access. Reduced time is desired between making a selection and having the selection.

With expanded storage, processing and display capabilities, portable devices that play media content (e.g., audio, video, text, haptic material, etc.) are becoming ubiquitous. Portable media players (PMP) can also be just one aspect of a convergent handheld device that has uses such as a personal digital assistant (PDA), cellular telephone, email application, etc. For some users who travel frequently, a mobile communication device that serves at least in part as a PMP can become a predominant source of entertainment and information.

Third-generation (3G) communication networks, which are still being deployed, are all digital, and offer data access in addition to voice services and include W-CDMA (known also as UMTS), and CDMA2000 EV-DO. Operators that support a population of mobile communication devices offer certain capabilities for selecting and downloading media content, either unicast or multicast. Typically, the video display quality is appropriate for the relatively small displays of a smart phone or similar handheld device wherein the high data compression makes use of the bandwidth constrained channel economically feasible.

New PMPs are offering larger displays and increased memory storage that are suitable to playing video with higher quality. Thus, downloading of media content requires access to a broadband communication channel with sufficient data rates for downloading larger files. These broadband network access ports or wireless coverage areas at a home or public place act as an intermediary between a source of the media content and the end user PMP. Given the large bandwidth consumption needed by the PMP to download, for example, a movie file, there can be few locations with sufficient capability to allow such use. Moreover, with increasing numbers of such PMP devices, the existing infrastructure of broadband network access locations available for PMP devices to use within a reasonable period of time can be expected to be limited. Consequently, the distribution of media content to PMP-capable devices can be limited to those who rely upon home use and have made the necessary investment in broadband network access.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with providing a deployment and distribution model for improved content delivery that provides a business incentive for placement of kiosks with one or more wireless access points in public locations so that portable media players (PMPs) can receive media content (e.g., audio, video, text, haptic content, etc.). In addition, coordination between subscribing users of PMPs, vendors who provide kiosks, and a network central controller of a content distribution system allow for prepositioning of video content at the kiosks through economically desirable low data rate communication links from the network (e.g., dial-up modem, DSL, etc.); coordinated queuing of downloads (e.g., partial downloads) between kiosk to PMP, peer-to-peer (P2P) downloading between PMPs, and uploads from PMP to kiosk; billing/crediting to correspond with such participation in the distribution; and changing priority/selection of prepositioning of content at kiosks to reflect a clientele profile.

In one aspect, a method wirelessly acquires media content. Media content selection is received from a user via user interface. A first portion of the selected media content from a wireless access point, which had accessed the selected media content from local storage. A second portion of the selected media content is requested and received from a wireless communication channel. Reporting receipt of at least a portion of the selected media content to a network controller.

In another aspect, at least one processor wirelessly acquires media content. A first module receives media content selection from a user via user interface. A second module receives a first portion of the selected media content from a wireless access point, which had accessed the selected media content from local storage. A third module requests and receives a second portion of the selected media content from a wireless communication channel. A fourth module reports receipt of at least a portion of the selected media content to a network controller.

In an additional aspect, a computer program product for wirelessly acquiring media content has a computer-readable storage medium having a first set of instructions for causing a computer to receive media content selection from a user via user interface. A second set of instructions causes the computer to receive a first portion of the selected media content from a wireless access point, which had accessed the selected media content from local storage. A third set of instructions causes the computer to request and to receive a second portion of the selected media content from a wireless communication channel. A fourth set of instructions causes the computer to report receipt of at least a portion of the selected media content to a network controller.

In another additional aspect, an apparatus wirelessly acquires media content. Means are provided for receiving media content selection from a user via user interface. Means are provided for receiving a first portion of the selected media content from a wireless access point, which had accessed the selected media content from local storage. Means are provided for requesting and receiving a second portion of the selected media content from a wireless communication channel. Means are provided for reporting receipt of at least a portion of the selected media content to a network controller.

In further aspect, an apparatus wirelessly acquires media content. A user interface receives media content selection from a user. A communication module receives a first portion of the selected media content from a wireless access point, which had accessed the selected media content from local storage, and for requesting and receiving a second portion of the selected media content from a wireless communication channel. A content distribution controller reports receipt of at least a portion of the selected media content to a network controller via the communication module.

In yet one aspect, a method wirelessly distributes media content. A media content selection is received from a user via user interface. A first portion of the selected media content from local storage is transmitted via a wireless access point to a subscriber portable device. A second portion of the selected media content is transmitted from a wireless communication channel. A report of receipt of at least a portion of the selected media content is received by a network controller.

In yet another aspect, at least one processor wirelessly distributes media content. A first module receives media content selection from a user via user interface. A second module transmits a first portion of the selected media content from a wireless access point, which had accessed the selected media content from local storage, to a subscriber portable device. A third module transmits a second portion of the selected media content from a wireless communication channel. A fourth module receives a report of receipt of at least a portion of the selected media content to a network controller.

In yet an additional aspect, a computer program product wirelessly distributes media content by having a computer-readable storage medium containing a first set of instructions that causes a computer to receive media content selection from a user via user interface. A second set of instructions causes the computer to transmit a first portion of the selected media content from a wireless access point, which had accessed the selected media content from local storage, to a subscriber portable device. A third set of instructions causes the computer to transmit a second portion of the selected media content from a wireless communication channel. A fourth set of instructions causes the computer to receive a report of receipt of at least a portion of the selected media content to a network controller.

In yet another additional aspect, an apparatus wirelessly distributes media content. Means are provided for receiving media content selection from a user via user interface. Means are provided for transmitting a first portion of the selected media content from a wireless access point, which had accessed the selected media content from local storage, to a subscriber portable device. Means are provided for transmitting a second portion of the selected media content from a wireless communication channel. Means are provided for receiving a report of receipt of at least a portion of the selected media content to a network controller.

In yet a further aspect, an apparatus wirelessly distributes media content. A communication module receives media content selection from a user via user interface. A vendor access point transmits a first portion of the selected media content from local storage to a subscriber portable device. A wireless communication channel transmits a second portion of the selected media content. A billing module receives a report of receipt of at least a portion of the selected media content to a network controller.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
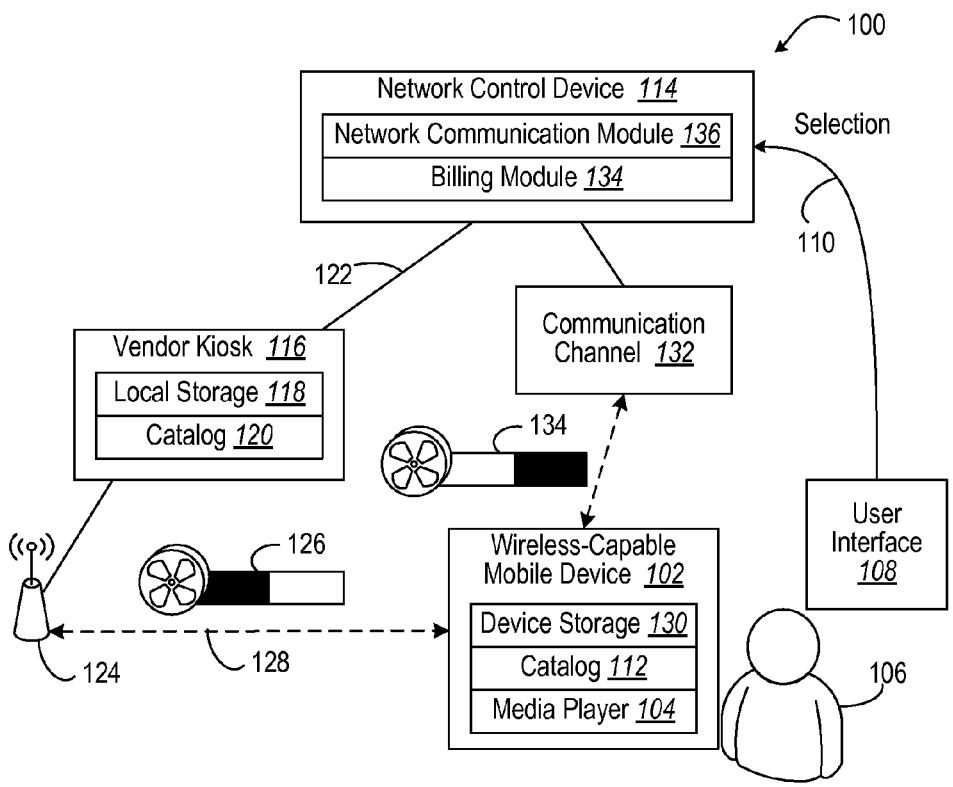
FIG. 1 illustrates a block diagram of a content delivery system for wirelessly transmitting media content to a portable device partially through a kiosk access point and partially via communication channel.

Turning to the Drawings, in FIG. 1, an exemplary content delivery system 100 economically expeditiously distributes media content to a wireless capable mobile device 102 that comprises or includes a media player 104. A user 106 can utilize a user interface 108, which can be external or integral to the mobile device 102, to communicate a selection 110, such as found in a media content catalog 112 received by the mobile device 102 or the user interface 108.

In another aspect, these selections 110 can comprise a more general category in advance of specific selections being available or being specifically selected. For example, the user can select "top movie download of the week" or "any movie starring John Smith". In an additional aspect, for a user interface 108 integral to or in local communication with the mobile device 102, the user can make selections "off-line" as a "wish list", which can include query search terms that are user generated without benefit of a pre-established catalog listing or be from the catalog as previously received. The selection 110 thus becomes known to other entities of the content delivery system 100 when in wireless communication range.

A network control device 114 of the content delivery system 100 receives the selection and authorizes the user 106 as a subscriber for receiving the selected media content. Advantageously, a vendor kiosk 116 has previously received the media content and stored the media content in local storage 118 along with an updated catalog 120 reflecting availability of media content for wireless distribution to the mobile device 102. Prepositioning can utilize a low band width communication channel 122 such as a broadcast signal from which the vendor kiosk 116 records certain content items as directed or selected. Prepositioning can utilize a dial-up modem or DSL communication connection 122 to a public telephone switched network (PSTN). In addition, prepositioning can utilize a broadband connection 122 during off-peak hours to avoid or mitigate impacts to a vendor's other uses of the communication bandwidth. It should be appreciated that even high bandwidth connections such as a T1 line can be sufficiently limited by various user demands or size of the content to be considered a low band width communication channel 122 for the purpose of receiving media content. Alternatively or in addition, the download can be given priority after receipt of the selection by the user 106.

The user 106 who is carrying the mobile device 102 can enter a coverage area of a wireless access point 124 managed by the vendor kiosk 116, such as being positioned in a retail establishment or public area. Thus, without making a dedicated effort to retrieve the selected media content, the mobile device 102 can exchange communications with the vendor kiosk 116, such as receiving the updated catalog 120 reflecting the availability of the prior selection. In response, in one aspect, the vendor kiosk 116 authenticates the user 106 with either locally or by facilitating a pass through to the network controller 114 for authentication. The vendor kiosk 116 transfers wirelessly at least a portion of the selected media content, as depicted at 126, by a wireless data packet coverage area 128, which can be dynamically adjusted in size based on other queued requests or interference from other APs (not depicted) and reported to the network control device 114 for tracking transaction progress and billing/credit. The wireless-capable mobile device 102 stores the received, at least partial media content in device storage 130. The mobile device 102 can provide download progress feedback to the user 106, thereby allowing the user 106 to choose to remain within coverage area 128 for a sufficient time to complete the download.

In the illustrative depiction, according to one aspect, the user 106 leaves the coverage area 128 before completing the download. In some implementations, the mobile device 102 not only determines what portion remains to be downloaded at the next opportunity, but can also provide the partial media content for playback by the media player 104. At a subsequent time, an opportunity arises for completing the download via a communication channel 132, described below, that completes sending the remaining portion of the media content, depicted at 134. When a network communication opportunity exists, the mobile device 102, the communication channel 132, or another vendor kiosk (not shown) reports completion of the download and/or contributions of various intermediaries so that appropriate billing and credits can be awarded by a billing module 134 for participating in the content delivery system 100. The network control device 114 can include a network communication module 136 for interfacing to the vendor kiosk 116 and directly or indirectly to other recipients such as communication channel 132 and user interface 108.

The communication channel 132 can comprise another vendor kiosk, another wireless capable mobile device that has previously downloaded the media content as a subscriber, or an alternative backhaul network utilized to complete media delivery. For example, a smart cell phone can be both capable of 802.11n wireless access as well as $2^{nd}$ or $3^{rd}$ generation cell phone communication. The user 106 can have a previously established preference or make affirmative selection to incur an additional charge to complete download by the backhaul network. Alternatively or in addition, to enhance quality of service, the network control device 114 can initiate use of the backhaul network to culminate the download transaction when a vendor kiosk 116 has not completed the download. In one aspect, a determination threshold based upon an elapsed time for the download or a threshold of a ratio of the media content remaining to download can trigger the backhaul download.

FIGS. 2 and 5-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 2:
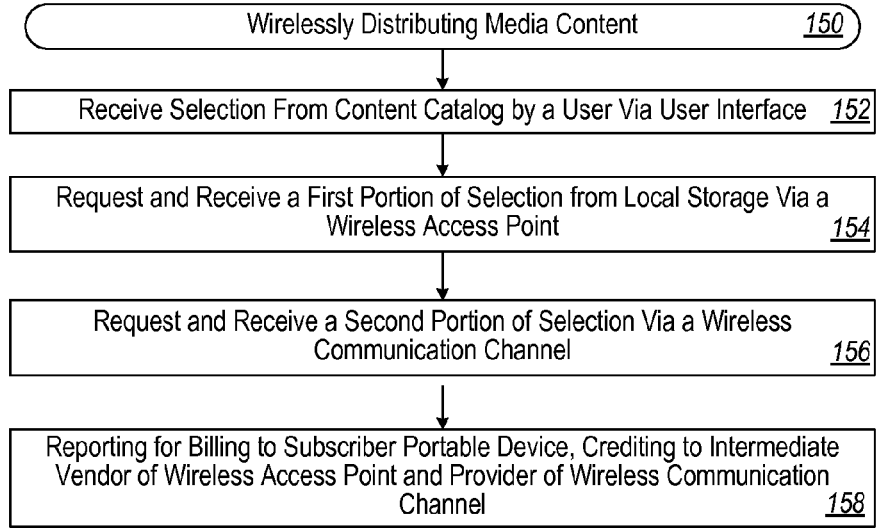
FIG. 2 illustrates a methodology for wirelessly distributing media content.

With reference to FIG. 2, a methodology 150 for wirelessly delivering media content is initiated by receiving a selection from a media content catalog by a user via a user interface (block 152). A user equipment (e.g., mobile communication device, converged handheld computer, access terminal, smart phone, portable media player, wireless-capable handheld game console, personal digital assistant, etc.) requests and receives a first portion of the selection from a wireless access point, which advantageously has the content readily available in local storage (block 154). Subsequently, the user equipment requests and receives the other portion of the selection via a wireless communication channel (block 156). This channel can be another access point managed by the same vendor kiosk, another kiosk coverage area, a peer-to-peer (P2P) transfer from another subscriber's PMP, a backhaul network, or broadband home connection, etc. Participation in completing the media content delivery is reported to the network controller in order to credit intermediaries, providing an incentive for expanding the coverage by the content delivery system, as well as to confirm billing appropriate for the end user (block 158). Gradations in billing based on partial downloads can reflect the cost to the network and/or intermediaries of utilizing various communication channels.

Figure 3:
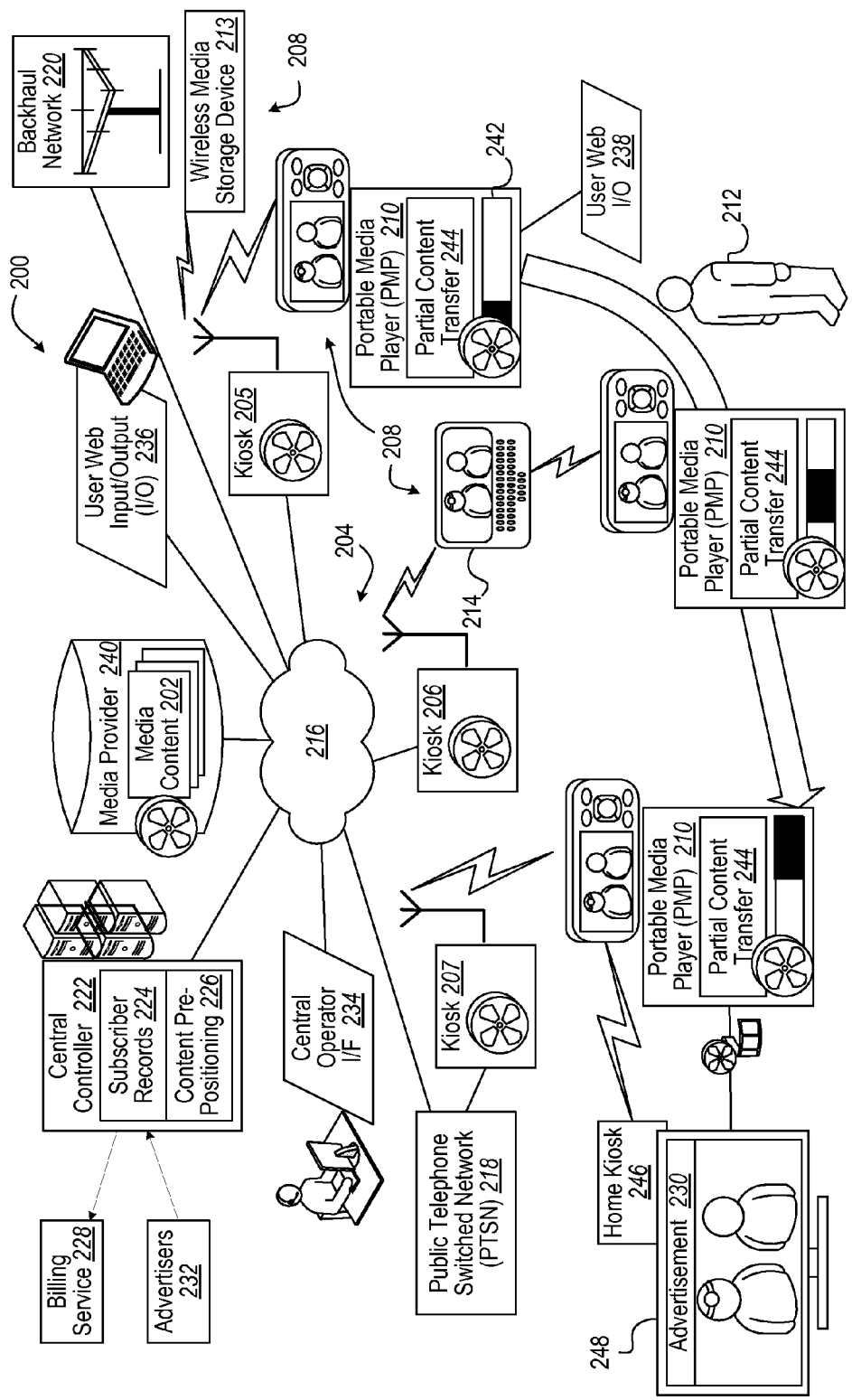
FIG. 3 illustrates a block diagram of a content delivery system utilizing a communication network for wireless distribution of media content to a portable device.

With reference to FIG. 3, a content delivery system 200 improves upon delivery of media content 202 over a communication network 204 by utilizing a plurality of strategically placed vendor kiosks 205, 206, 207 that have an economic incentive to service a plurality of wireless-capable portable devices 208. It should be appreciated that portable devices 208 can comprise a number of types handheld or carried apparatus with a unitary or distributed construction that perform a more dedicated function (e.g., solely media player) or are a converged device having media player as one function (e.g., smart phone). In the illustrative depiction, a population of wireless-capable portable devices 208 are depicted as including a personal media player (PMP) 210 carried by a user 212, a wireless media storage device 213, and a converged handheld computer 214. It should be appreciated with the benefit of the present disclosure that for clarity a media player 210 is depicted in a sequence, highlighting user interactions with a portable device 208 that can immediately enjoy or utilize media content of the communicated selection. However, aspects of a portable device 208 can encompass a wider range of capabilities, such as a handheld or notebook computer (e.g., converged handheld computer 214) having a media player 210 as one application. Alternatively, aspects of a portable device 208 can be limited to capabilities of the wirelessly capable media storage device 213 that takes advantage of opportunities to economically download content for later playback on another device.

The communication network 204 can provide communication channels of varying data throughput, interoperability and coverage areas. For example, portions of the communication network 204 can comprise a public or private Internet 216, public telephone switched network (PSTN) 218, and/or an over-the-air broadcast carrier (e.g., unicast, multicast, one-way, two-way, WiMax, cellular telephone, etc.), depicted as a backhaul network 220 for media content distribution purposes. In the exemplary depiction, the communication channel via the PTSN 218 to vendor kiosk 207 is very economical, albeit slow, for downloading large media files and provides an opportunity for prepositioning popular catalog selections well in advance of a user 212 being in proximity.

A network controller 222 manages the content delivery system 200 by maintaining a subscriber record data structure 224 and content pre-positioning tracking data structure 226 that is reflected in updated catalogs. The central controller 222 relays billing and credits to a billing service 228 and receives advertisements 230 from advertisers 232 for merging or coupling in some instances with delivered media content 202. A central operator interface (I/F) 234 can provide human interaction/configuration of central controller 222, operator assistance via the PTSN 218 with users 212, or facilitating a user web input/output (I/O) service 236 for subscribing or for receiving selections. Web-enabled portable devices 208, such as depicted at 238, can incorporate a web I/O 238 for making selections. Media providers 240 that provide access to the media content 202 can facilitate data rights management (DRM) for end user access and use limitations on the media content 202. It should be appreciated with the benefit of the present disclosure that a delivery path for the content and the delivery path for the data rights can differ from each other. For example, the content can be delivered in advance from a kiosk while the rights might be delivered via a generic access point once the user deletes previous content. As another example, the content can be delivered by a peer PMP and the rights can be delivered via a network kiosk, etc.).

In an illustrative use case, the PMP 210 enters a coverage area of the kiosk 206, which can be dynamically adjusted, resulting in receiving a first portion of a selection, which can include user indication as depicted at 242. The kiosk 206 can optimize queuing of content to multiple portable device, such as depicted with wirelessly capable media storage device 213 and and PMP 210. For example, the kiosk 206 can complete delivery of media content one at a time as one approach to queue optimization. Alternatively, if sufficient bandwidth exists, simultaneous transmission to multiple devices 210, 213 can occur, such as when the kiosk 206 has multiple available channels. As another example, the kiosk can prioritize transmissions for those with sufficient channel quality, excluding those that would require significant redundant coding or retransmissions for successful download. Upon leaving the coverage area or shutdown of the PMP 210, a partial content transfer module 244 verifies the integrity of the partial transfer, prepares a report to the network for the next opportunity to upload to a kiosk 205-207, and in some instances format the partial transfer for playback. The kiosks 205-207 can determine that the PMP 210 has left coverage area in one aspect by determining that data rate has dropped below a certain threshold, that an unacceptably high error rate, or by detected received power. Subsequently, the PMP 210 forms an ad hoc network with the other subscribing portable device 214 that is able to transfer another portion of the selection previously downloaded or relayed from kiosk 206. Subsequently, the PMP 210 completes the download from kiosk 207, which can be the same device as a home kiosk 246 that archives or supplements the downloaded selection from the PMP 210. The home kiosk 246 (e.g., a set-top box, home computer, dedicated device, etc.) or the PMP 210, in some aspects, can then stream or download the media content for playback on a full-size display monitor 248. Assisting in the distribution of media content can further entail uploading from a portable device 208 to a vendor kiosk 206.

Figure 4:
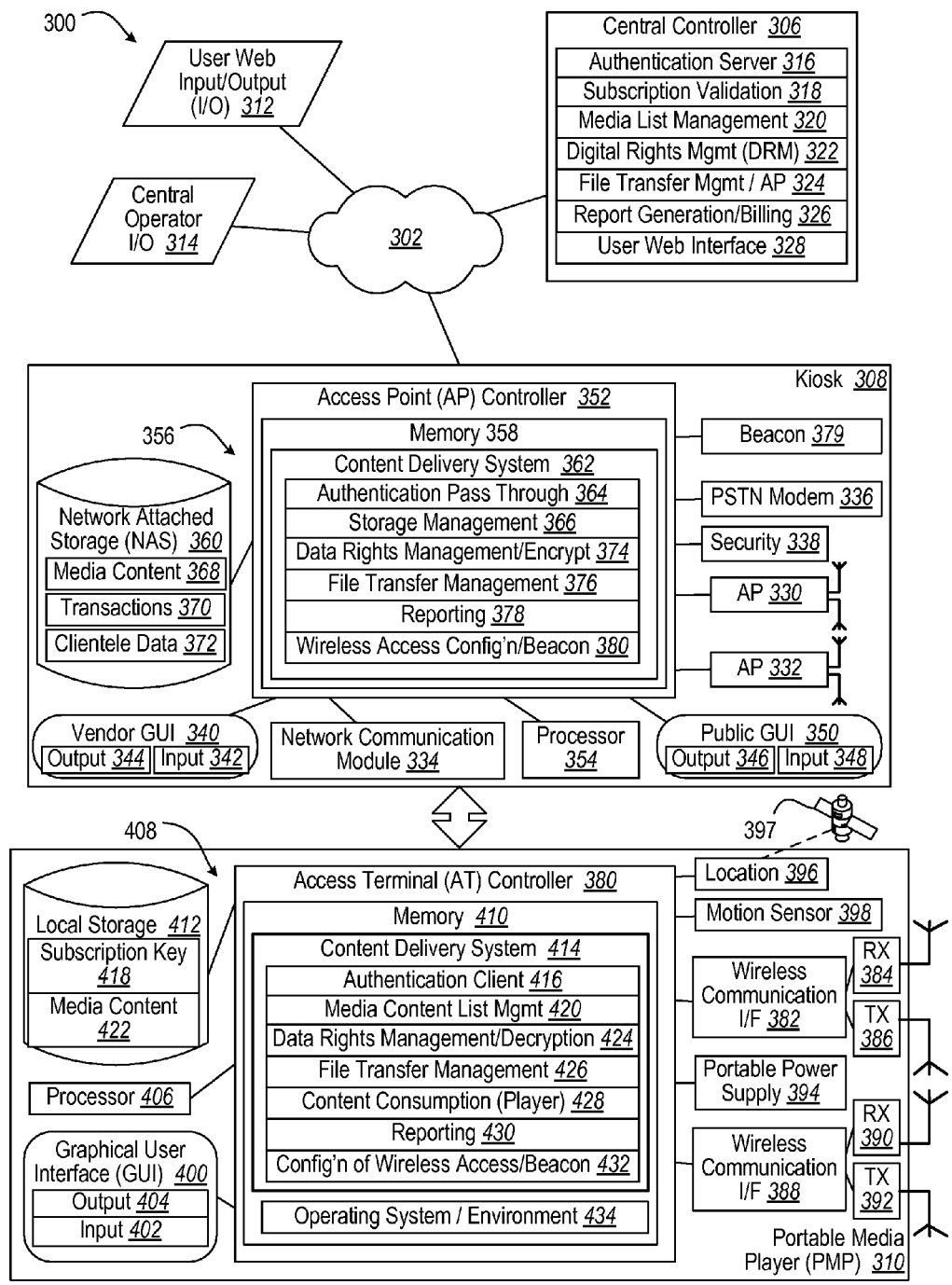
FIG. 4 illustrates a block diagram of a network central controller, a kiosk, and a portable device such as a portable media player (PMP)

Referring now to FIG. 4, an exemplary content delivery system 300 can utilize a communication network 302 so that a network central controller 306 can manage delivery of media content to a vendor kiosk 308 for wireless transmission to a subscriber's PMP 310. Although not illustrated, network 302 can also include other communication network components, such as a base station controller, a mobile switching center, a position determination entity, a group communications server, etc., operable to facilitate communications and services provided to vendor kiosk 308 and other components. Network 302 may be any private or public wireless or wired communications network operating according to any known standard, including Code Division Multiple Access (CDMA), cdmaOne, cdma2000, Universal Mobile Telecommunication System (UMTS), Wideband CDMA, Global System for Mobile Communications (GSM), and TIA/EIA-136, WiMax, DSL, cable modem link.

A user web input/output (I/O) 312 enables changes to subscription, review of billing/credits, transaction history, catalog review and content selection, device configuration setup, user preferences, etc. A central operator I/O 314 facilitates supervision of the content delivery system 300 and customer service, etc. The central controller 306 further comprises an authentication server or module 316 for verifying subscriber identity. A subscription validation module 318 cross references the subscriber identity with access rights under a currently active subscription. A media list management module 320 maintains data as to available media content, their configuration (e.g., format, compression), locations available, currency with regard to a distributed content catalog, etc. A digital rights management module 322 implements requisite data encryption, tracking and reporting to satisfy contractual and statutory protections necessary or desirable for media content. A File Transfer Management to Access Point (FTM/AP) module 324 provides appropriate protocols and tracking for downloading media content to kiosks 308. In an exemplary embodiment, the FTM/AP can advantageously be robust and platform independent or platform configurable so that the same module can also be distributed to new vendor kiosks 308 for wirelessly serving PMPs 310. A report generation/billing module 326 facilitates billing and customer relations functions. A user web interface 328 interacts with the user web I/O 312.

The kiosk 308 can manage a plurality of access points (APs) 330, 332 for providing a desired coverage area. In an exemplary implementation, the APs can utilize an 802.11n wireless protocol, although it should be appreciated that various near field, personal access network, wireless access network, wide area network, and broadcast protocols can be used in various applications as desired or appropriate. A network communication channel can be provided by a network communication module 334 capable of data packet protocol communication. Alternatively or in addition, a PSTN modem (e.g., DSL) 336 can provide an economical, albeit limited throughput, connection. Unauthorized use of the wireless coverage area or the network communication channel can be prevented by a security module 338.

Although the kiosk 308 could be wholly controlled from another entity such as the central operator I/O 314, the kiosk 308 can advantageously include a vendor graphical user interface (GUI) 340 with input device 342 and an output device 344 for allowing the vendor to adjust configurations, monitor transactions, review/alter locally stored media content, manually adjust priority requests from the network, initiate communications with the network, etc. For example, an input device 342 can comprise a mechanism such as a key, keypad and/or keyboard, a mouse, a touch-screen display, a microphone, etc. In certain aspects, an input device 342 provides for user input to interact with an application, or program or module. Further, for example, an output device 344 may include audio speaker, display, a haptic feedback mechanism, etc.

In some applications, the kiosk 308 comprises a public GUI 346 with an input device 348 and an output device 350 such as described above. The public GUI 346 could be provided by the vendor GUI 340 with a security lockout to limit available functions. The public GUI 346 can provide additional interactivity, especially for certain PMPs 310 that lack certain user interface features.

Further, kiosk 308 can include a computer platform, depicted as an access point (AP) controller 352 that comprises a processor 354 and memory 356. Processor 354 controls the operation of kiosk 308 according to applications or programs or modules stored in memory 356, which can comprise random access memory (RAM) 358 and nonvolatile memory, depicted as network attached local storage 360. The control functions may be implemented, for example, in a single microprocessor, or in multiple microprocessors. Suitable microprocessors may include general purpose and special purpose microprocessors, state machines, as well as digital signal processors. Further, for example, processor 354 may be an application-specific integrated circuit (ASIC), or other chipset, logic circuit, or other data processing device. Processor 354 or other data processing device such as ASIC can execute an application programming interface (API) layer that interfaces with any resident applications, and/or programs and/or modules, such as a content delivery system module 362, stored in memory 358.

Memory 356 represents all of the memory associated with kiosk 308, and may include both random access memory (RAM) and read-only memory (ROM), erasable ROM (EPROM), electronically erasable ROM (EEPROM), flash cards, or any memory common to computer platforms. Further, memory 356 may include one or more flash memory cells, or may be any secondary or tertiary storage device, such as magnetic media, optical media, tape, or soft or hard disk. For example, computer program instructions and data utilized in the operation of kiosk 308 may be stored in non-volatile memory, such as EPROM, EEPROM, and/or flash memory. Additionally, memory 356 may be implemented as discrete devices, stacked devices, or may be integrated with processor 354. Memory 356 can also include areas partitioned into and designated for use as temporary memory buffers, or for use by content delivery system module 362.

The content delivery system module 362 can comprise modules that perform various functions for the delivery of media content. An authentication pass through module 364 passes through various security protocol messages to the central controller 306. Alternatively or in addition, the kiosk 308 can contain sufficient capability to autonomous authenticate. A storage management module 366 maintains inventory of locally-stored media content 368, transaction records 370, and clientele data 372 in network-attached local storage 360. The content delivery system module 362 can further comprise a data rights management/encryption module 374 that implements copyright/contractual protections to limit uses of the media content 366. A file transfer management module 376 manages delivery of media content 368 to the PMP 310. A reporting module 378 prepares transaction data for local stored transaction records 370 or for communication to the central controller 306. A wireless access configuration and beacon control module 380 manages the plurality of APs 330, 332 and sets parameters for a beacon signal to alert PMPs 310 as to the presence and direction of the coverage area provided by the APs 330, 332. The beacon signal can be a particular synchronization/broadcast channel capability of another component used for data communications. Alternatively, a dedicated radio frequency (RF) beacon 379 can be provided to provide an extended range signal for enhancing the situational awareness of a user in locating the coverage areas available.

In an exemplary aspect, the PMP 310 can comprise cellular telephone. It should be understood with the benefit of the present disclosure that the PMP 310 may include any computerized device capable of receiving broadcast signals, such as a Personal Digital Assistant (PDA), a satellite telephone, a palm computer, a Personal Communication Services (PCS) device, a portable gaming or music device, etc. In particular, the PMP 310 comprises a computing platform, depicted as an access terminal (AT) controller 380 that control request and receipt of media content from the kiosk 308. This receipt can be made via a wireless communication interface module 382 having a receiver 384 and transmitter 386. The PMP 310 can be a dual mode device capable of maintaining simultaneous sessions, depicted by a second wireless communication interface module 388 with receiver 390 and transmitter 392. The simultaneous sessions can be to the same radio access technology or to different radio access technologies. For example, the PMP 310 can be integral to a smart phone capable of cellular communications and 802.11 data communications. In an exemplary aspect, a portable power supply (e.g., batteries, ultra-capacitors, fuel cell, solar panel, motion-powered generator, etc.) 394 provides enhanced mobility. Increased service life can be achieved by entering a sleep/wake cycle with the wireless communication interface modules 382, 388 to reduce power consumption.

The PMP 310 can advantageously sense or receive geographic location information from a location module 396, depicted as being responsive to global positioning system (GPS) satellites 397. It should be noted, however, that location module 396 may alternately, or in addition, be responsive to a terrestrial-based wireless communication network, e.g. a CDMA network, where all or some portion of position determination may be based on communications with base stations, and/or where location determination calculations are performed in whole or in part by network servers. Alternatively or in addition, the location module 396 can comprise an inertial platform that detects changes in location. A motion sensor 398 can comprise an accelerometer or other transducer that provides data for calculating acceleration, velocity and location based on motion. The motion sensor 398 can also provide orientation data for adjusting the display automatically for viewing angle. The motion sensor 398 can also provide user interaction data to determine when to actively seek connection to a kiosk 308 or to alter the sleep/wake cycle. For example, when the PMP 310 is not moving at all, a stationary condition can be determined making checking for access to an AP 330, 332 unwarranted, perhaps resulting in shutting down altogether or lengthening sleep periods. Alternatively or in addition, the location module 396 can receive direction finding/signal strength/node location information from a network device (not shown) that determines the location of the PMP 310.

The AT controller 380 can be indirectly controlled in whole or in part by a separate GUI (e.g., a home PC based synchronization software). In the exemplary aspect, an integral GUI 400 with input device 402 and an output device 404 allows the user to adjust configurations, monitor transactions, review/alter locally stored media content, playback content, make selections from a catalog of media content, initiate communications with the network such as for subscription updates, etc. In some aspects, these user inputs can be made while out of range of a kiosk or other network connection. For example, an input device 402 can comprise a mechanism such as a key, keypad and/or keyboard, a mouse, a touch-screen display, a microphone, etc. In certain aspects, an input device 402 provides for user input to interact with an application, or program or module. Further, for example, an output device 404 may include audio speaker, display, a haptic feedback mechanism, etc.

The AT controller 380 that comprises a processor 406 and memory 408. Processor 406 controls the operation of PMP 310 according to applications or programs or modules stored in memory 408, which can comprise random access memory (RAM) 410 and nonvolatile memory, depicted as network attached local storage 412. The control functions may be implemented, for example, in a single microprocessor, or in multiple microprocessors. Suitable microprocessors may include general purpose and special purpose microprocessors, state machines, as well as digital signal processors. Further, for example, processor 406 may be an application-specific integrated circuit (ASIC), or other chipset, logic circuit, or other data processing device. Processor 406 or other data processing device such as ASIC can execute an operating system/application programming interface (API) layer 413 that interfaces with any resident applications, and/or programs and/or modules, such as a content delivery system module 414, stored in memory 410. API 413 can be a runtime environment executing on the PMP 310. One such runtime environment is Binary Runtime Environment for Wireless® (BREW®) software developed by Qualcomm Incorporated of San Diego, Calif. Other runtime environments may be utilized that, for example, operate to control the execution of applications or programs or modules on PMP 310.

Memory 408 represents all of the memory associated with kiosk 308, and may include both random access memory (RAM) and read-only memory (ROM), erasable ROM (EPROM), electronically erasable ROM (EEPROM), flash cards, or any memory common to computer platforms. Further, memory 408 may include one or more flash memory cells, or may be any secondary or tertiary storage device, such as magnetic media, optical media, tape, or soft or hard disk. For example, computer program instructions and data utilized in the operation of PMP 310 may be stored in non-volatile memory, such as EPROM, EEPROM, and/or flash memory. Additionally, memory 408 may be implemented as discrete devices, stacked devices, or may be integrated with processor 406. Memory 408 can also include areas partitioned into and designated for use as temporary memory buffers, or for use by content delivery system module 414.

The content delivery system module 414 can comprise modules that perform various functions for the delivery of media content. An authentication client 416 communicates through the authentication pass-through module 364 to the authentication server 416 of the central controller 306 using a subscription key 418 stored in local storage 412. A media content list management 420 tracks media selected for download as well as media content 422 partially or wholly received and stored in local storage 412. A DRM/decryption module 424 utilizes appropriate keys to decrypt the media content 422 for play or other authorized uses (e.g., streaming to an attached monitor). A file transfer management module 426 assists in tracking receipt or transmission of media content, including partial receipt/transmission. A content consumption (e.g., player) module 428 provides playback on the local user output device 402. A reporting module 430 prepares transaction data for local logging and/or for reporting to the central controller 306 for billing/crediting purposes. A wireless access configuration/beacon module 432 configures wireless setup as appropriate to communicate with the kiosk 308, a P2P to another PMP 310, or a broadcast signal from a backhaul network (not shown in FIG. 4). It should be appreciated with the benefit of the present disclosure that certain capabilities can be distributed or omitted and that this depiction is exemplary. For example, user interface features can be external and further can be remote. In some aspects, the portable media player 310 is functionally achieved by a portable wirelessly-capable media storage device that is coupled to an external display and controls. For example, a docking station of a home media system (not shown) can access the stored media content.

Figure 5:
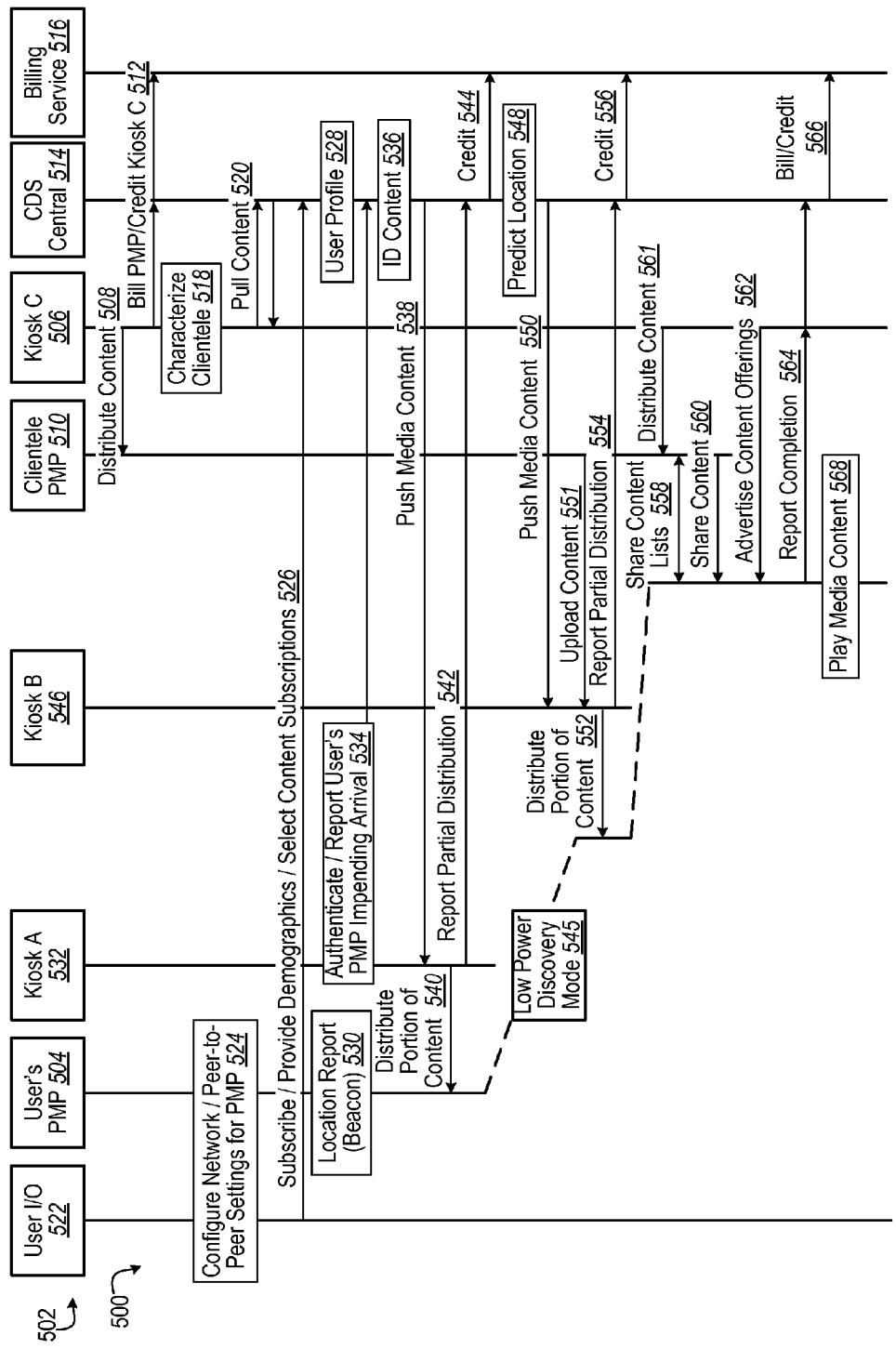
FIG. 5 illustrates a timing diagram of a user PMP downloading media content from kiosks and another PMP that originates from a central component of a content distribution system.

With reference to FIG. 5, a scenario 500 of content delivery system (CDS) 502 illustrates how media content can be non-obtrusively and economically delivered to a user's PMP (portable device) 504. Prior to interaction with the (CDS) 502 by the user, a vendor kiosk 506 can be distributing media content as depicted at 508 to a population of portable devices, depicted as a Clientele PMP 510. These transactions result in a report as depicted at 512 to a CDS Central Controller 514 that passes on billing and crediting information to a Billing Service 516, such as crediting the vendor for serving as an intermediary and billing the clientele for the media selected and received via the CDS 502. These transactions can further be characterized, for example, for determining what genres of media content are more profitable and/or more requested, and at what locations. Although this determination can be performed in whole or in part at various entities of the CDS 502, this characterization of clientele is depicted at 518 as occurring at the Kiosk C 506, which uses the results to pull (reprioritize) content from the CDS central controller 514 as depicted at 520.

It should be appreciated with the benefit of the present disclosure that in some applications a content delivery system can thus leverage APs characterizing a population of users in its coverage area that is used to adjust content available for delivery by the APs. For example, the APs can access a shared user profile divulged by mobile devices. As another example, the APs can cross reference an identifier for the mobile devices with a user profile maintained at a network entity. Thus, when a kiosk or a particular AP managed by a kiosk is detected as having a particular demographic (e.g., 80% of users are male, aged 18-25), the content pushed or pulled for the kiosk can be altered accordingly.

The user of the PMP 504 can access services from the CDS 502 via a user input/output (I/O) device 522. For example, the I/O could be a graphical user interface, a human or automated telephone interface, a web portal, a haptic interface, etc. Moreover, this user I/O 522 can be integral to the PMP 504 or external (e.g., home or office workstation). The user I/O 522 can configure as depicted at 524 network subscription information, configure technical or preferential settings for network communications, kiosk communications, or peer-to-peer (P2P) communications. For example, the user may prefer not to consume battery power in uploading content to the kiosk or to another subscriber. Otherwise, the user may prefer to participate in media content delivery in order to receive a credit. The user may or may not prefer to make location or user identity automatically evident to kiosks or to other subscriber devices. In order to be better served in content prepositioned for download, the user may prefer to share demographic information that can explicitly identify content of interest or locations frequented. The user I/O 522 can also make selections in accordance with the subscription to have media content downloaded, such as selected from a media list catalog. These subscriptions/demographic information/content selections are transmitted from the user I/O 522 as depicted at 526 to the CDS central controller 514, which can utilize a communication channel such as an Internet connection, PTSN, mail-in form, etc. The CDS central controller 514 in turn updates the user profile accordingly as depicted at 528.

The user PMP 504 can be sensing or causing a location report to be generated as depicted at 530. For example, a cellular, Short Message Service (SMS), an 802.11 access point, etc. can sense a beacon from the PMP 504. Such location information can be gathered when no media content selections are pending for download for the purposes of characterization a user specifically or a demographic profile for clientele in general for a particular kiosk location. The location report can be determined by the receiving entity, depicted as a proximate vendor kiosk A 532 as merely being within the coverage area. Alternatively or in addition, the location report can be based upon geographic coordinates divulged by the PMP 504, especially for communication modalities have an inherently large coverage area (e.g., WiMax). In response, the kiosk A authenticates the user's PMP 504 at 534, either autonomously or by communicating with a remote network such as the CDS Central 514, and reports the impending arrival for a beacon of greater range than data communication range. Alternatively or in addition, the kiosk A 532 collects such information for periodic reporting to the CDS central controller 514.

In some implementations or for certain kiosks such as kiosk A 532, a high bandwidth connection from the CDS central controller 514 can exist. In this instance, the CDS central controller 514 can be monitoring user profile as depicted at 536, including pending selection downloads and location tracking. Sufficient time can exist for the CDS central controller 514 to identify content to push to the kiosk 532 as depicted at 538. The kiosk A 532 distributes a portion of the selected media content as depicted at 540 to the PMP 504. In some instances Connection between PMP 504 and kiosk A 532 terminates before full download of the selected content, such as due to insufficient time, the kiosk 532 not having a full copy of the media content in time, powering down of either device, etc. In response, the kiosk A 532 reports partial distribution to the CDS central controller 514 as depicted at 542, which responds in turn by sending a credit report to billing service 516 as depicted at 544.

The PMP 504 can enter a low power discovery mode as depicted at 545 when transitioning between coverage areas. Radio Frequency (RF) transceiver circuitry can be intermittently activated to discover and acquire a kiosk 532. In addition, a low power state can be used when in a coverage area between downlink and uplink slot allocations. Alternatively or in addition, automatic or manually set power saving mode can be entered into to extend service life, such as when the user has not made a pending selection awaiting for download or when a power supply state reaches a certain low level.

In some implementations or for certain kiosks such as a kiosk B 546, a low bandwidth communication channel exists for receiving media content from the CDS central controller 514. For example, the channel is a PTSN connection. As another example, the channel is heavily utilized for other purposes leaving a small allocation to such media downloads. The CDS central controller 514 can perform a location prediction process as depicted 548, which can entail characterization a general population that frequents a kiosk location or can target a particular user that is predicted by past behavior or based upon a current trajectory to be within the coverage area of kiosk B 546. With this prediction, the CDS central controller 514 can push media content in advance to the kiosk B 546 as depicted at 550. Media content can also be received by the kiosk 546 from a Clientele PMP 510 that volunteers to upload when visiting the coverage area of kiosk 546 as depicted at 551. For example, the Clientele PMP 510 could receive certain credits from the CDS central controller 514 in order to being willing to share stored content. Subsequently, PMP 504 enters the coverage area and receives a distribution of a further portion of the content as depicted at 552, which might terminate before completion. In response, the kiosk B 546 makes a report at some point to the CDS central controller 514 regarding the partial distribution at 554, which in turn makes a credit report at 556 to the billing service 516. The PMP 504 stores the download stop point to support the process of resuming download upon the next visit of a Kiosk.

Subsequently, the user's PMP 504 comes within P2P range of the clientele PMP 510 that has previously received the media content as depicted back at 508. Alternatively, clientele PMP 510 can serve as an intermediary node in an ad hoc network to extend the range of the kiosk C 506. The PMPs 504, 510 share content lists including selections desired and content available for delivery as depicted at 558. In response to a request to complete delivery of the selected media content, the clientele PMP 510 transmits the remaining portion of the selection to the user's PMP 504 as depicted at 560. The kiosk C 506 can be delivering or receiving media content from other devices simultaneously or sequentially, as depicted at 561.

The kiosk C 506 can have additional selections that are locally available that are advertised peer-to-peer to the user's PMP 504, for example an updated catalog reflecting annotations for what is locally available can be provided as depicted at 562. When the PMP 510 is within network communication, a report of completed delivery of the selected media content is made, such as to kiosk C 506 as depicted at 564 that is relayed to the CDS central controller 514, which in turn generates a bill/credit report as depicted at 566 that can credit clientele PMP 510 for assisting in the delivery of the media content. With the media content delivered, the user's PMP 504 can play the media content as depicted at 568, which can be an integral player or an external device.

Figure 6:
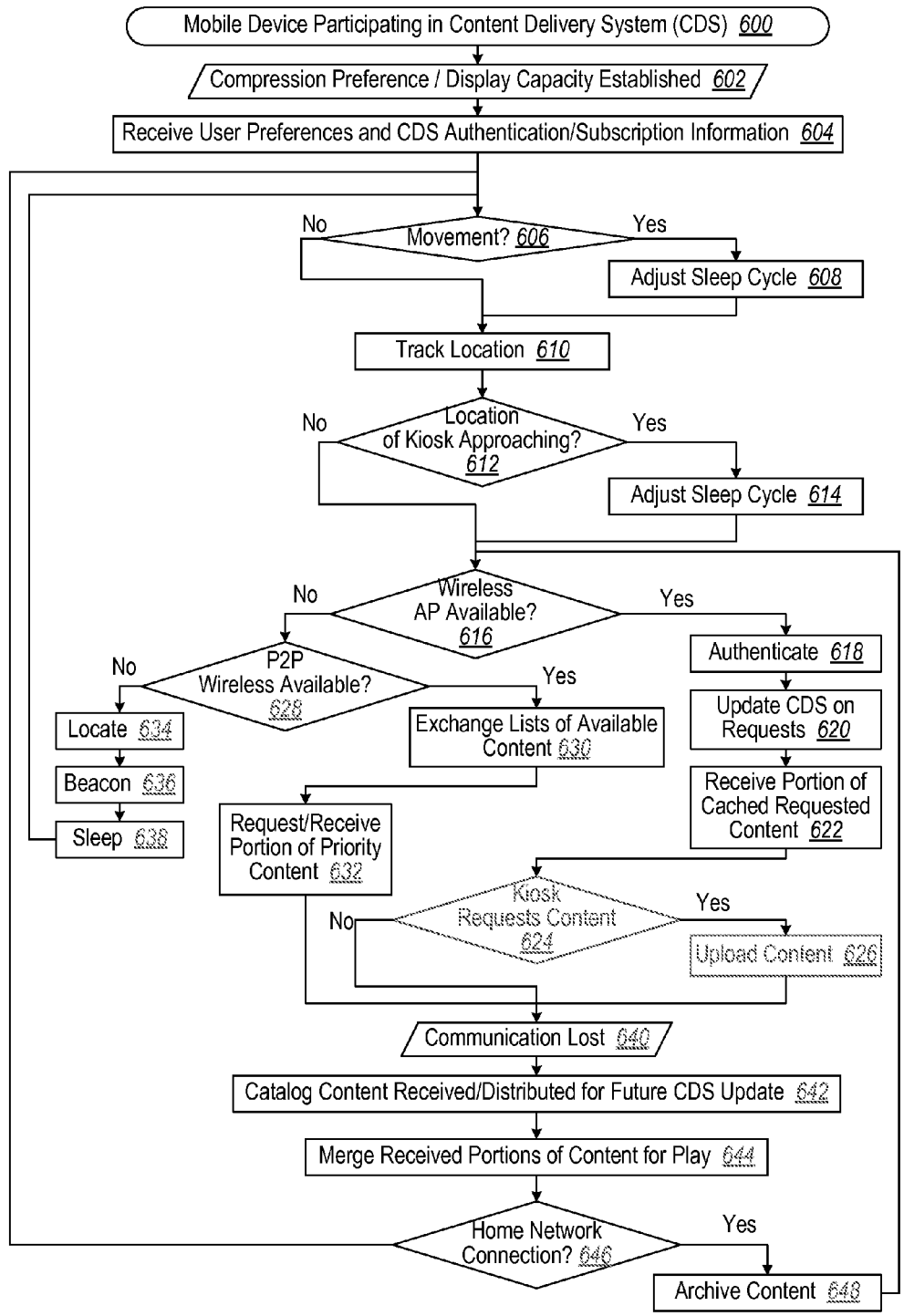
FIG. 6 illustrates a flow diagram for a portable or mobile device participating in the content delivery system.

With reference to FIG. 6, an exemplary methodology 600 is illustrated for a mobile device (e.g., PMP) to participate in a content delivery system (CDS). Preferences are established as depicted at 602, which can be dictated by device limitations, download time trade-offs with image compression quality, user preferences, subscription rates for bandwidth consumed, etc. In block 604, the mobile device can receive information pertaining to user preferences, CDS authentication, subscription keys, etc., especially in instances where services are established wholly or in part via another communication channel, such as a home workstation.

In block 606, a determination is made as to whether movement of the mobile device is sensed. If so, sleep cycle (block 608) can be adjusted for detecting a kiosk or similar access point or access node for requesting and receiving media content. In some aspects, the mobile device tracks its own location for reporting or internal use (block 610). For example, the mobile device can remember past sessions or have a location cross reference that enable a determination that a kiosk coverage area is approach (block 612). If so, the sleep cycle can also be adjusted (block 614) or beacon initiated to expedite session initiation. The beacon for example can be a longer range but limited data rate control signal for negotiating session parameters so that the data transmission makes efficient use of a short duration of time within range for full data communication.

In an illustrative implementation, a power saving mode of the mobile device thus includes waking up at predetermined time, which can comprise a synchronized time for avoiding collisions or missing a beacon signal. Alternatively, one party such as the AP provides a carrier (beacon) signal of sufficient duration and repetition that a relatively short waking period by the mobile device suffices for listening for coverage areas. As a further alternative, the AP can have a sufficiently long listening period (e.g., continuously) that a very brief beacon signal from the mobile device during a waking period is sufficient for locating, identifying or synchronizing to the sleep cycle of the mobile device for the AP to initiate a communication session.

In block 616, a determination is made as to whether a wireless AP is available. If so, authentication occurs in block 618. The CDS network entity can be updated on any selection requests or fulfillment that were made on the mobile device while out of network communication (block 620). The mobile device can receive at least a portion of requested content that is cached or stored by the wireless AP (kiosk) in block 622. If in block 624 the kiosk has requested content from the mobile device, then in block 626 the requested content can be uploaded.

If at block 616 a kiosk wireless AP was not available, a further determination can be made at block 628 whether a P2P wireless connection is possible to another subscriber mobile device or to an ad hoc network that has a node for a kiosk. If so, list of available content can be exchanged (block 630) and requests for and delivery of at least a portion of priority content can be made (block 632).

If at block 628 no P2P was available, then location can be updated (block 634), beacon settings updated (block 636) and sleep cycle adjusted or complied with (block 638), with processing returning to block 606 for continued monitoring.

before or after full receipt of selected media content, the mobile device catalogs in block 640 the content received, including verifying data integrity and applicability of DRM decryption keys for playback. Participation of various entities in the delivery can be logged for credit/billing purposes. In block 642, for instances of partial delivery, the content that is received can be merged into a form suitable for playback in block 644, which can entail concatenating and decrypting. In some aspects, in block 646 a determination is made as to whether a home network connection is available, which if so enables archiving content at block 648 for playback on external devices or protecting against data loss.

Figure 7:
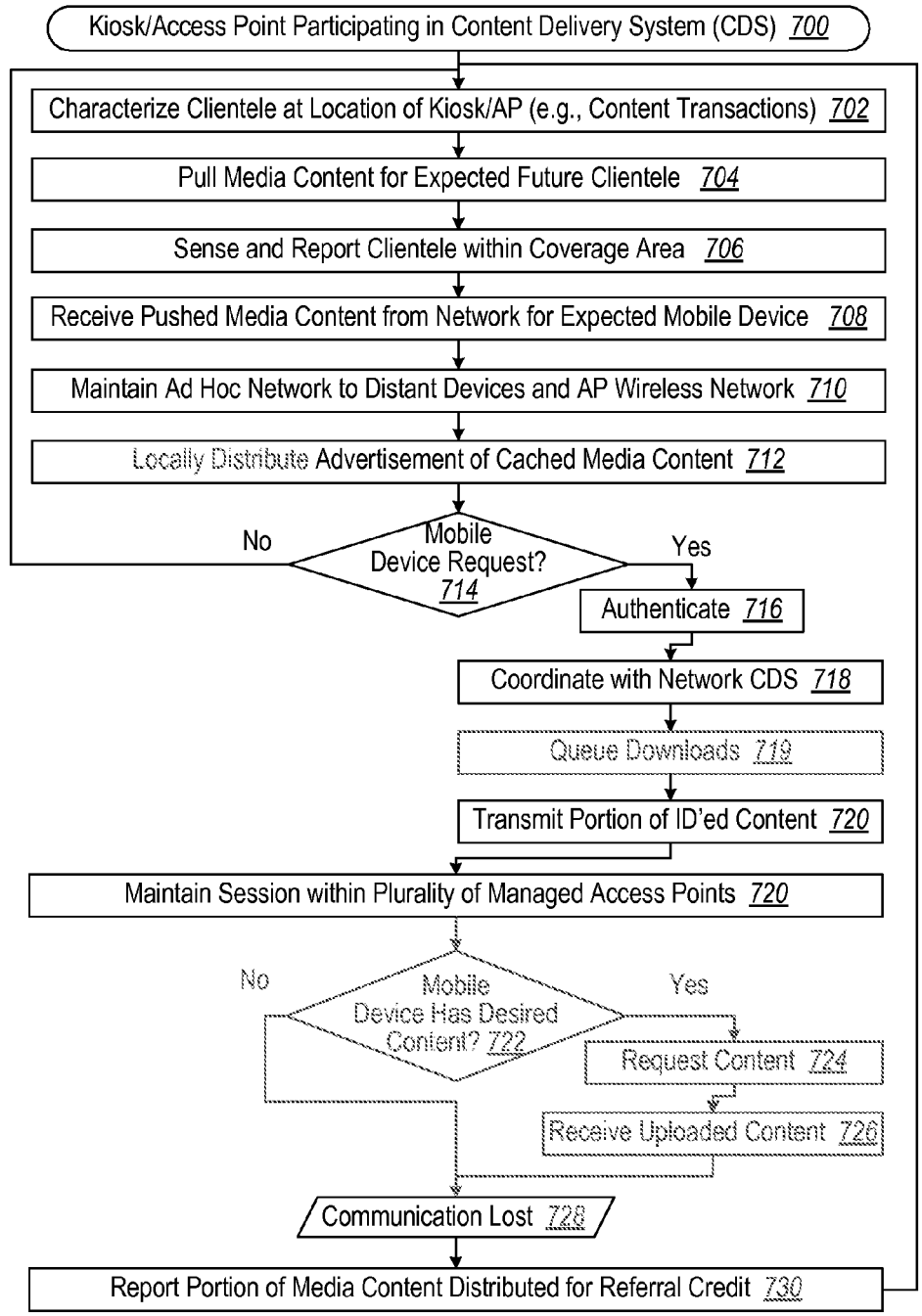
FIG. 7 illustrates a flow diagram for a kiosk/access point participating in the content delivery system.

With reference to FIG. 7, an exemplary methodology 700 is illustrated for a kiosk/wireless access point to participate in a content delivery system. Remotely or at the kiosk, a characterization of clientele at a location can be determined, such as by receiving demographic information from the users, analyzing content transactions, manually input characteristics from anecdotal experience or user requests, etc., in block 702. The kiosk can pull media content for expected future clientele (block 704).

The kiosk can sense and report clientele within the coverage area (block 706). For example, the number of nonparticipating wireless-capable mobile devices can yield marketing data as to the effectiveness of subscription campaigns. Presence of a particular device identifier can be used to deduce a pattern of behavior, whether a subscriber or not. Subscribers who are sensed but who have not made a selection for media content can identify opportunities for further advertising to the subscribers.

In block 708, the kiosk receives media pushed from the network for an expected mobile device. For example, the trajectory of the mobile device has been predicted based on recent encounters with other access points or the behavior indicates impending arrival within a time frame suitable for prepositioning media content.

In block 710, the kiosk maintains ad hoc network connection to distant devices as well as maintaining an AP wireless network to deliver advertisements and selected media content. In block 712, in addition to advertising to subscribers, the kiosk can advantageously transmit an advertisement to wireless capable devices that are not yet subscribers regarding the available media content cached for immediate delivery.

In block 714, a determination is made as to whether a mobile device has made a request for media content. If so, the mobile device is authenticated in block 716. This authentication could be made offline based on a local subscriber database or made online by coordinating with the network CDS (block 718). Distribution among a plurality of mobile devices is managed by queuing transmission (block 719). Optimal queuing can be achieved in one aspect by transferring at a reasonably maximum rate in which a first requester can receive content, giving remaining bandwidth or awaiting completion of transmission before downloading content to a subsequent requester. Such optimization can be based at least in part upon link quality and channel bandwidth limitations to each mobile device. Queuing can also ration available air link bandwidth by satisfying a single request from each mobile device in turn before fulfilling a second request from one of the mobile devices. Optimizing transmission can also take into consideration link quality with each mobile device. For example, certain devices may be given a lower priority or be ignored if the link quality is low so that an overall successful data delivery rate is achieved. In response to the request, in block 720 at least a portion of the identified (selected) content is transmitted to the mobile device. This transmission can be coordinated amongst a number of access points controlled by the kiosk in block 720 to extend the session continuity over a coverage area. A determination is made in block 722 whether the mobile device contains stored media content that is desired by the kiosk. If so, a request is made in block 724 and the upload is received in block 726. In some instances, the mobile device could refuse in order to preserve battery power. In block 728, the communication is lost. At least an approximation of the amount of media content transmitted for delivery is reported for referral credit in block 724. Thus, it should be appreciated with the benefit of the present disclosure that the kiosk benefits from receiving media content by one or more types of transfers, described above as being pushed or pulled with regard to the network CDS or being uploaded from a mobile device.

Figure 8:
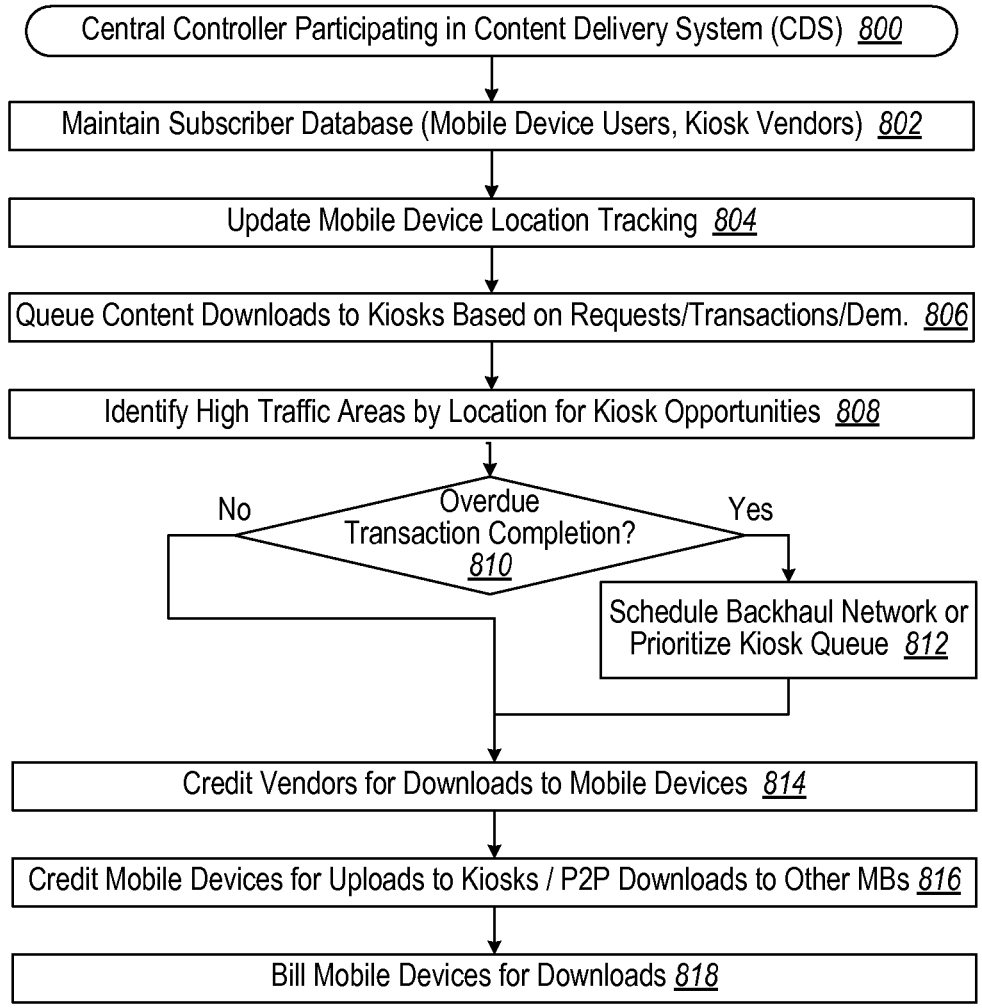
FIG. 8 illustrates a flow diagram for a network central controller participating in the content delivery system.

With reference to FIG. 8, an exemplary methodology 800 is illustrated for a network central controller to participate in a content delivery system. In block 802, a subscriber database is maintained, including those participating as mobile device for receiving media content as end users as well as kiosk vendors who act as intermediaries. In block 804, location reports about mobile devices are tracked and updated. In block 806, the content downloads are queued for kiosks based upon requests by the kiosks, pass-through requests from individual mobile devices, characterization of past transactions, or predictions based upon demographic data for a particular kiosk location. In block 808, analysis of high traffic areas can identify locations that have potential for another vendor kiosk to expand the coverage area of the CDS as well as generating vendor revenue to warrant the infrastructure increase. In block 810, a determination is made as to whether a particular transaction is overdue for completion. If so, the network can schedule a backhaul network transmission to the mobile device or prioritize a download to kiosk queue to satisfy the delivery (block 812). Periodically, received transaction reports can be used to credit vendors and P2P deliveries to a kiosk or to a subscribing mobile device (block 816). In addition, the mobile device can be billed for downloads of the media content (block 818).

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for wirelessly acquiring media content comprising:
   wirelessly initiating a purchase of media content;
   receiving, at a mobile device, media content selection from a user via a user interface;
   receiving, at the mobile device, authorization to receive selected media in connection with initiating the purchase of media content;
   requesting and receiving from a wireless access point, at the mobile device, a first portion of the selected media content;
   requesting and receiving, through peer-to-peer communications, at the mobile device, a second portion of the selected media content from a wireless communication channel, said requesting and receiving of the second portion of the selected media being accomplished by the user via the user interface in connection with the mobile device being outside of communication coverage with the wireless access point;
   entering a sleep cycle, to effect power savings, for radio communications in response to a determination of being outside of communication range with the access point and the wireless communication channel;
   adjusting a period of the sleep cycle in response to sensing motion of the subscriber portable device or to sensing a geographic location of the subscriber portable device relative to a known location of the access point; and
   reporting receipt of at least a portion of the selected media content to a network controller.

2. The method of claim 1, further comprising transmitting a beacon signal during a waking period of the sleep cycle.

3. The method of claim 1, further comprising synchronizing media content between the subscriber portable device and a home kiosk.

4. The method of claim 1, further comprising:
   receiving media content selection from a user via user interface integral to the subscriber portable device; and
   playing the media content after being received and locally stored on the integral user interface.

5. The method of claim 1, further comprising receiving a media content catalog comprising a plurality of available selections.

6. The method of claim 1, further comprising receiving a selection comprising a category of media content.

7. The method of claim 1, further comprising receiving a selection comprising a media content query.

8. A mobile apparatus for wirelessly acquiring media content comprising:
   a content distribution and control apparatus;
   a user interface apparatus for receiving media content selection from a user;
   a wireless communication apparatus for receiving, at the mobile device, authorization to receive selected media content in connection with initiating purchase of media content;
   apparatus for requesting and receiving from a wireless access point at least a first portion of the selected media content;
   apparatus for requesting and receiving, through peer-to-peer communications at the mobile device, a second portion of the selected media content from a wireless communication channel, said requesting and receiving of the second portion of the selected media being accomplished by the user via the user interface in connection with the mobile device being outside of communication coverage with the wireless access point;

a location module, the content distribution control apparatus responding to the location module to adjust a sleep cycle of the wireless communication apparatus and to report location to the network controller;

a motion sensor, the content distribution control apparatus responding to the motion sensor to adjust a sleep cycle of the wireless communication apparatus;

and apparatus for reporting receipt of at least a portion of the selected media content to a network controller.

9. The apparatus of claim 8, provided as a subscriber portable device, wherein the user interface apparatus comprises a graphical user interface integral to the subscriber portable device for selection of media content and play of received media content.

10. The apparatus of claim 9, further comprising:

a home kiosk for synchronizing media content with the subscriber portable device; and a display monitor in communication with the home kiosk for playing the media content.

11. The apparatus of claim 8, wherein the user interface apparatus is configured for receiving a media content catalog comprising a plurality of available selections.

12. The apparatus of claim 8, wherein the user interface apparatus is configured for receiving a selection comprising a category of media content.

13. The apparatus of claim 8, wherein the user interface apparatus is configured for receiving a selection comprising a media content query.

* * * * *